April 15, 1941.                A. C. KIRSHNER                2,238,527
                         MERCHANDISE TICKET PRINTER
                  Original Filed Feb. 1, 1936    2 Sheets-Sheet 1

Inventor
Arthur C. Kirshner
By
Carl Benst
His Attorney

April 15, 1941.  A. C. KIRSHNER  2,238,527
MERCHANDISE TICKET PRINTER
Original Filed Feb. 1, 1936    2 Sheets-Sheet 2

Inventor
Arthur C. Kirshner
By
Earl Benst
His Attorney

Patented Apr. 15, 1941

2,238,527

UNITED STATES PATENT OFFICE 2,238,527

MERCHANDISE TICKET PRINTER

Arthur C. Kirshner, Dayton, Ohio, assignor to The National Cash Register Company, Dayton, Ohio, a corporation of Maryland Original application February 1, 1936, Serial No. 61,921. Divided and this application June 14, 1937, Serial No. 148,022

3 Claims. (Cl. 235—22)

This invention relates to a simple sales record machine which is especially adapted for use in connection with systems employing pin tickets or similar price tags usually attached to the merchandise, and is a division of the application for United States Letters Patent of Arthur C. Kirshner, Serial No. 61,921, filed February 1, 1936, now Patent No. 2,105,660, issued January 18, 1938.

It is an object of this invention to provide an inexpensive and efficient sales record machine which requires no electric motor, no receipt or detail paper, and no sales books.

An additional object is to provide a sales record machine which entirely eliminates the possibility of error where it is usually necessary for the clerk to read the price from the price ticket on the merchandise and write it on the sales book or set it up on the keys of a register.

A further object is to provide a machine which uses the original price ticket placed on the merchandise in the marking room as a medium for the control of the cash.

A still further object is to provide a machine which compels the clerk to detach a stub from the price ticket, which is used for the purpose of keeping a stock control or perpetual inventory.

It is also an object of this invention to provide a new and novel machine having a common operating means adapted to operate the selected one of a plurality of printing and severing mechanisms under the control of an inserted price ticket.

Another object is to provide a sales record machine adapted to have inserted therein a price ticket, print a consecutive number on two portions of said ticket, print or emboss upon the main body of said ticket the word "Paid," sever a portion of said ticket from the main body thereof, and simultaneously therewith deposit the severed portion of said ticket in a receptacle provided for that purpose.

A further object is to provide a simple and inexpensive type of sales record machine adapted to have inserted therein a price ticket, print a consecutive number on two portions of said ticket, print or emboss upon the main body of said ticket the word "Paid," sever a portion of said ticket from the main body thereof, deposit the severed portion of said ticket in any one of a plurality of receptacles provided for the purpose of classifying the transaction according to class, department, or clerk, and simultaneously therewith operate one of a plurality of cash drawers provided for the purpose of segregating the cash according to the classification of the transaction.

A further object of the invention is to provide a novel mechanism for unlatching a cash drawer common to a group of independent registering units.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

*General description*

Described in general terms, the present invention comprises a simple and inexpensive type of machine for keeping sales records, and is especially designed to have inserted therein the price ticket which is taken from the merchandise by the clerk and to have printed on that ticket the consecutive number of the sale and also the word "Paid." This machine uses the original price ticket placed on the merchandise in the marking room as a medium for the control of the cash and as a perpetual inventory. The price ticket has formed thereto a stub portion which is adapted to be severed from the main body thereof by the machine and dropped into a locked receptacle. The price of merchandise, stock number, and other data desired by the store are preprinted on both the main body of the ticket and on the stub portion thereof.

When recording a sale, the salesperson inserts the price ticket into the machine and manually operates the machine. When the machine is thus operated, mechanism provided therein prints on the back side of both the main body of the price ticket and on the stub portion thereof a consecutive number, prints or impresses on the back side of the main body of the ticket the word "Paid" and any desirable identifying symbol, such as a clerk's number, and finally severs the stub portion of the ticket from the main body thereof and deposits it in a locked receptacle provided for that purpose.

The main body of the price ticket remains attached to the merchandise and is used by the customer as a receipt. In the event the merchandise is returned for any reason, the word "Paid" on the price ticket indicates that the sale was properly recorded and the consecutive number thereon enables checking it up with the stub portion thereof which has been retained by the store for its record.

At the end of any specified period of time, the receptacle may be unlocked and the stub portions of the price tickets removed therefrom for the purpose of obtaining the amount of cash for which the clerk is responsible. These stubs may then also be used for inventory purposes. The key to the locked receptacle is usually in the possession of the manager or any other authorized person. There is also provided in this machine especially designed means for preventing operation of the machine until it is released by the insertion of a price ticket.

Figure 2:
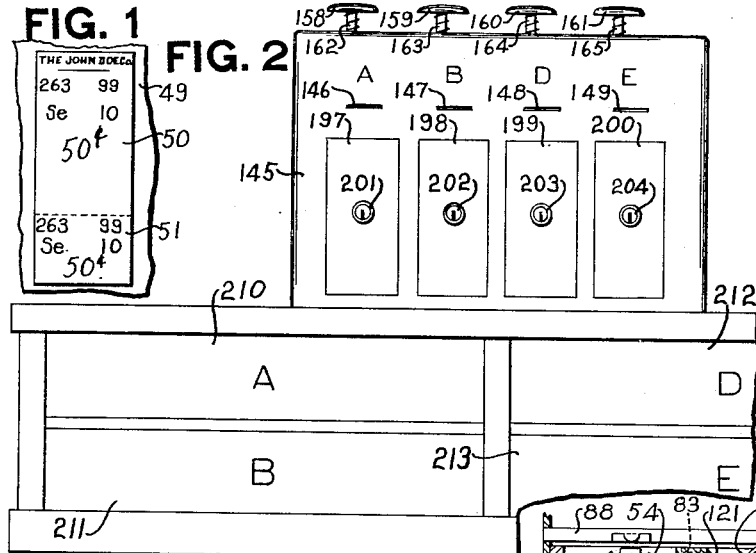
Fig. 2 is a front elevation, partly broken away, of one form of the invention provided with four sets of printing and severing mechanisms and a like number of cash drawers.

Two methods of embodying the invention are disclosed herein, the preferred form being shown generally in Fig. 2, wherein a separate actuating means is provided for each printing and severing unit. There may be a number of these unit mechanisms associated together in the same cabinet, four being the number selected for this particular disclosure.

Figure 9:
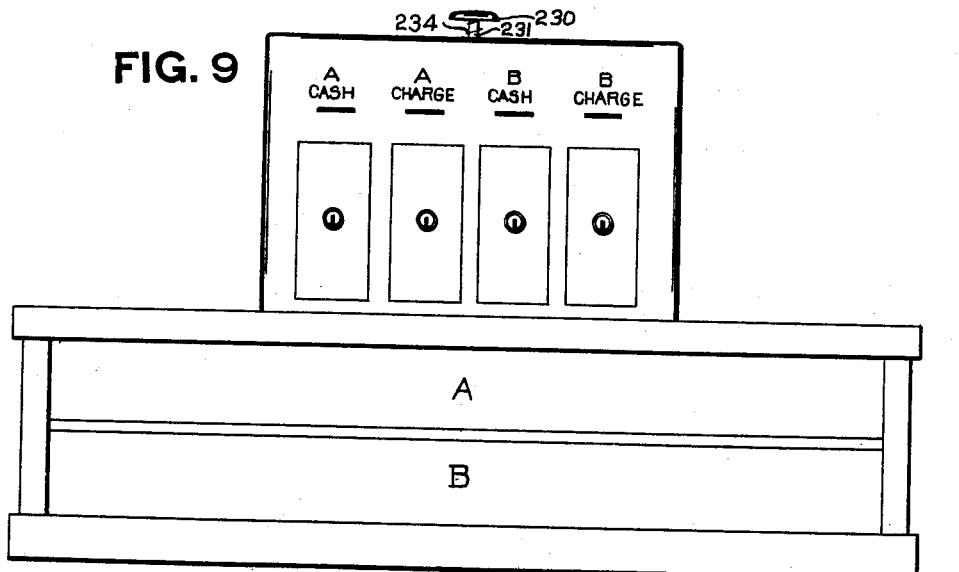
Fig. 9 is a front elevation of a modified form of the invention, showing a machine provided with four sets of printing and severing mechanisms, all of which are actuated by a common operating means.

A modified form of the invention is shown in Fig. 9 and consists of a single operating means for a number of printing and severing units, pairs of which are associated with a common drawer. The purpose of the pairing of printing and severing units is to provide for segregating cash and credit transactions entered by the same clerk.

*Detailed description*

A simple and inexpensive sales record machine, such as that disclosed in Figs. 2 and 5 to 8, combines a plurality of ticket printing and severing units with a like number of ticket receptacles and a plurality of cash drawers. Such a machine affords a number of classifications of the inserted price tickets as well as furnishing separate cash drawers for each classification.

The form of invention as shown in Figs. 2 and 5 to 8 comprises a casing or cabinet 145, having formed in the front side thereof four slots, 146, 147, 148, and 149, which are provided for receiving the inserted price tickets. The classification the severed portion of the price ticket is to receive is, of course, determined by whichever one of the slots the ticket is inserted into, as will be later described in detail.

Mounted within the casing 145 are four units, each unit comprising a printing and severing mechanism, one unit being associated with each of the slots 146 to 149 inclusive.

The casing 145 has mounted therein four blocks 150, 151, 152, and 153 (Figs. 6 and 7), one for each unit, each block carrying the upper portion of the printing and severing mechanism comprising its particular unit.

The casing 145 is secured to two transversely extending frames 154 and 155 (Fig. 6) secured to the top of a base 156. Mounted between and secured to the frames 154 and 155 is an auxiliary frame 157 bent to form a plurality of U-shaped sections to provide a support for the lower portion of the printing and severing mechanism of each of the various units.

*Price tickets*

Figure 1:
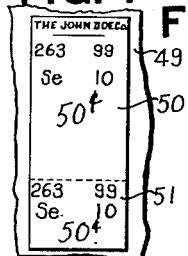
Fig. 1 is a facsimile of the price ticket secured to a piece of merchandise.
Figure 3:
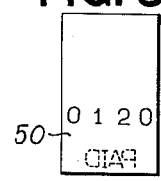
Fig. 3 is a facsimile of the back of the main body of the ticket, after the stub has been severed therefrom, showing the consecutive number and the word "Paid" printed thereon.
Figure 4:
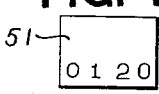
Fig. 4 is a facsimile of the back of the severed portion of the ticket.
Figure 5:
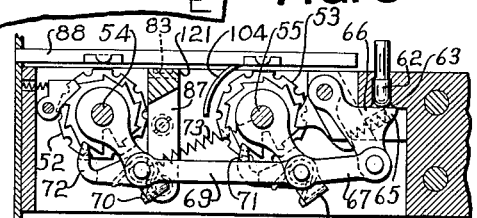
Fig. 5 is a detail side view, in enlarged scale, of the consecutive number printing mechanism.

One type of price ticket which may be used in connection with the present invention is illustrated in Fig. 1. This ticket comprises a main body 50 (Fig. 3) having attached thereto a stub portion 51 (Fig. 4). The price ticket has printed thereon, in duplicate, once on the main body 50 and once on the stub portion 51, the price of the merchandise, the serial number, and any other desired data. The main body 50 of the price ticket is fastened to the merchandise 49 in the usual manner. When recording a transaction on the present machine the stub portion 51 of the price ticket is severed from the main body thereof and retained in the machine, as will be hereinafter described. The main body 50 of the price ticket remains on the merchandise and serves as the customer's receipt.

*Printing mechanism*

The machine is provided with two sets of consecutive number printing wheels 52 and 53 (Figs. 5, 6, and 8) which are adapted to print on the back of the inserted price ticket a consecutive number in duplicate. The wheels 52 print on the main body 50 of the ticket, while the wheels 53 print on the stub portion thereof. The purpose of the consecutive number is to enable the identification of both the main body 50 and the stub portion 51 of the ticket, at any future time.

Figure 6:
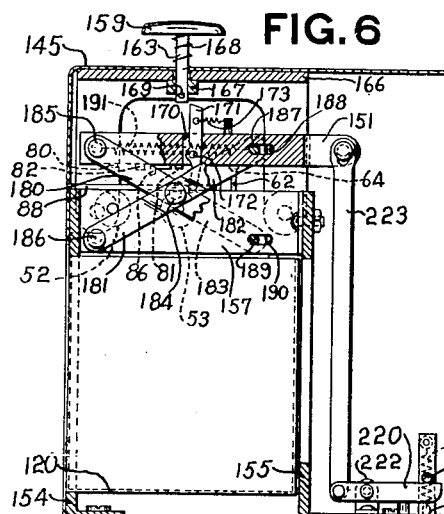
Fig. 6 is a vertical cross sectional view of the left side of the machine, shown in Fig. 2.
Figure 7:
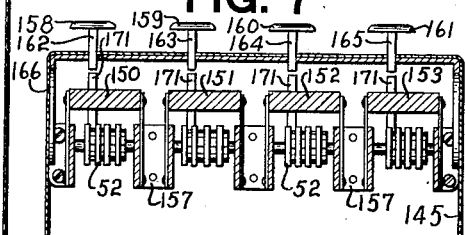
Fig. 7 is a front view of a portion of the consecutive number printing mechanism employed in the form of the invention illustrated in Figs. 2 and 6.
Figure 8:
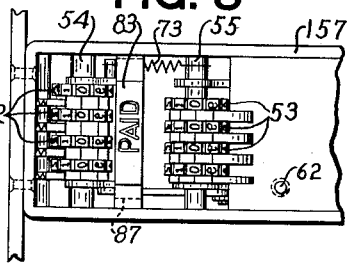
Fig. 8 is a plan view, in enlarged scale, of the printing mechanism.

The wheels 52 and 53 are mounted upon shafts 54 and 55, respectively, both of which are mounted in the U-shaped sections of the auxiliary frame 157, shown in Figs. 6 and 7. The consecutive number printing wheels are of the multiple tined deep notch transfer type, well known in the art and described in many patents, one of which is the patent to Thomas Carney, No. 876,295, dated January 7, 1908. A detailed description thereof will not be given here.

Both sets of wheels, 52 and 53, are advanced one step each time the machine is operated. To insure the simultaneous advancing of both sets of wheels 52 and 53 at the same time, a common actuating means therefor is provided.

It might be well to state at this point that there is a printing unit comprising both sets of wheels, 52 and 53, for each of the U-shaped sections of the auxiliary frame 157. In the illustrated machine in Figs. 2, 6, and 7, there are four such U-shaped sections, and therefore there are four printing units or sets of wheels 52 and 53.

The actuating means for advancing both sets of wheels 52 and 53 at the same time comprises a shouldered plunger 62 (Figs. 5 and 6) mounted in a counterbored opening in the frame 151. It is to be understood that there is a plunger 62 associated with each of the other frames 150, 152, and 153, but since all of the units are identical, that unit and the operating mechanism associated with the second section from the left will be described.

When the frame 151 is moved downwardly during an operation of the machine in a manner to be later described, a hammer pin 64 carried by the block 151 strikes the plunger 62 and moves it downwardly. The plunger 62 rests on a shoulder 65 of an arm 66 connected by a link 67 (Fig. 7) to a yoke 68 mounted on the shaft 55, while the yoke 68 is connected by a link 69 to a yoke 70 mounted on the shaft 54. The yoke 68 carries a multi-tined pawl 71 for actuating the printing wheels 53 and the yoke 70 carries a multi-tined pawl 72 for actuating the printing wheels 52. A spring 73 fast at one end to the yoke 70 and at its opposite end to the shaft 55 constantly tends to rock, through the links 69 and 67, the yokes 70 and 68 and the arm 66 counterclockwise.

It is thus apparent that when the plunger 62 is moved downwardly during an operation of the machine as above described, the lower end thereof rocks the arm 66 and, through the links 67 and 69, the yokes 68 and 70 clockwise, against the action of the spring 73, to advance the wheels 53 and 52 simultaneously one step. The spring 73 acts to return the parts to their normal position.

The blocks 150, 151, 152, and 153 carry printing blocks or pads 80 and 81 for taking imprints from the wheels 52 and 53, respectively, of their associated printing units.

Each of the blocks 150, 151, 152, and 153 also carries a type bar 82 having raised characters which coact with a die 83 (Fig. 8) which, when the machine is operated, embosses the word "Paid" upon the main body 50 of the inserted ticket. The die 83 is mounted in a bar 87 secured to the U-shaped sections of the auxiliary frame 157.

Any suitable type of ink ribbon device may be used in connection with the type wheels 52 and 53 and the printing pads 80 and 81 for printing upon the back of the insertable price ticket, in duplicate, a consecutive number.

For the purpose of guiding and properly alining the price ticket as it is inserted in the machine there is provided a chute 88 (Figs. 5 and 6) secured to the U-shaped sections of the auxiliary frame 157.

The machine is provided with severing mechanism which, immediately following the printing of the consecutive number and the embossing of the word "Paid" on the inserted price ticket, severs the stub portion 51 from the main body 50 thereof. When the stub 51 is thus severed from the main body of the ticket a guide plate 104 (Fig. 5), formed integral with and projecting downwardly from the chute 88, guides the severed stub so that it will drop into a receptacle 120 (Fig. 6) formed inside the machine cabinet 145 below each of the printing units.

The severing mechanism comprises a stationary knife blade 121 (Fig. 5) formed on the bar 87 and a knife blade 86 carried by the block 151. When the block is lowered during an operation of the machine, the knife blade 86 coacts with the knife blade 121 to sever the stub portion 51 from the main body 50 of the inserted price ticket.

As above stated, the printing and severing mechanism of each of the four units is identically the same.

*Operating means*

Each unit operates independently of the other; therefore separate operating means is provided for each unit. The operating means comprises four push buttons 158, 159, 160, and 161 (Figs. 2 and 7), one for each unit. The buttons 158 to 161 inclusive are each fastened to the upper end of one of a plurality of plungers 162, 163, 164, and 165, respectively, loosely mounted in openings provided in the upper side of the casing or cabinet 145. A U-shaped frame 166 (Figs. 6 and 7), secured at both ends to the frames 154 and 155, is provided with bearings 167, only one of which is shown, through which the plungers 162 to 165 slide. Each one of the plungers is provided with a coil spring 168, which normally maintains it in its elevated position. Each one of the plungers carries near its lower end a pin 169 which normally bears against the under side of the bearing 167 and thereby limits the upward movement of the plunger by the spring 168.

Each of the blocks 150 to 153 inclusive (Fig. 6) is provided with an opening 170 to accommodate a driving pawl 171. Each of these pawls is pivoted at 172 to its respective block and is held out of the path of movement of the plunger associated with that unit by a spring 173. Whenever a ticket is inserted into any one of the slots 146 to 149 inclusive (Fig. 2) the innermost edge of said ticket strikes the lower end of the pawl 171 associated with that unit and rocks said pawl counter-clockwise to position its upper end in the path of movement of its associated plunger. When the operator depresses the push button and plunger for that particular unit, the driving connection established by the position of the pawl in the path of movement of the plunger by the insertion of the price ticket causes the pawl 171 and its associated blocks to be moved downwardly with said plunger to perform the functions of the machine.

To insure a uniform movement of the block and to properly aline the same as it is lowered in the manner above described, a parallel movement device (Fig. 6) is provided between the blocks and the guide supports provided by the frame 157 for each unit. Inasmuch as this arrangement is the same for these units, a description of one unit will suffice for all.

The block carrying the upper portion of the printing and severing mechanism, and the stationary support provided by the bent or auxiliary frame 157 for carrying the lower portion of said mechanism, are connected together on one side by two levers 180 and 181 and on the opposite side by two levers 182 and 183. The levers of each pair are pivoted together at 184. The forward ends of the lever 180 and 183 are pivoted at 185 to the block, while the forward ends of the levers 181 and 182 are pivoted at 186 to the side supports provided by the auxiliary frame 157. The rear ends of the levers 181 and 182 are connected together by a rod 187 extending through an elongated slot 188 formed in the block, while the rear ends of the levers 180 and 183 are connected together by a rod 189 extending through a pair of slots 190 formed in both of the side supports provided for that unit by the auxiliary frame 157. It will be obvious that the slots 188 and 190 will permit the block 151 to move toward and away from the record material, but remaining parallel thereto, levers 180 to 183 inclusive performing the functions of controlling the uniform movement of the block and maintaining it in proper alinement.

After the operation of the machine is completed, the coil spring 168 returns the associated push button and plunger to their normal elevated positions. Corresponding blocks and levers 180 to 183 inclusive are returned to their normal positions by a spring 191 (Fig. 6), one end of which is secured to the lefthand end of the block, and the opposite end is fastened to the rod 187.

Stub receptacles

The lower portion of the casing is provided with four separate compartments or receptacles 120, one of said receptacles being associated with each one of the four units for receiving the severed stub portions 51 of the price ticket inserted in each one of their respective units.

The casing is provided on its front side with four doors 197, 198, 199, and 200, one for each of the above mentioned receptacles, for gaining access to the receptacles. The doors 197 to 200 inclusive are each equipped with locks 201, 202, 203, and 204, respectively, for preventing any unauthorized person from gaining access to the receptacle.

Cash drawer mechanism

Enclosed in the base 156 (Fig. 2) are four cash drawers 210, 211, 212, and 213, one of which drawers is associated with each unit. Whenever any one of the units is operated in the manner above described, the cash drawer associated with said unit is operated to open. Mechanism for operating and opening the cash drawers will now be described.

Associated with the cash drawers (Fig. 6) are a plurality of latches 214 (only two of which are shown), one for each cash drawer. The frame 155 and the base 156 are provided with openings 215 and 216 respectively for each of the latches 214, said latches being adapted to slide therein. Each latch 214 is retained in its latched position by a spring 217, one end of which is fast to the upper end of the latch and the opposite end is secured to the frame 155. Secured to the rear side of each cash drawer is a drawer keeper 218, the rear end of which is shaped in the form of a hook to engage the lower end of its associated latch 214, thereby holding its respective cash drawer in its closed position against the action of an expulsion spring 219, fast to the rear side of the base 156.

Secured to the frame 155 are a plurality of brackets 222 (only one of which is shown), one for each cash drawer. Pivoted to each one of these brackets 222 is a lever 220 (only one of which is shown) for releasing the latches 214. When such latches are released, the cash drawers are moved to their open positions by means of the springs 219. The rear end of each lever 220 is located directly beneath a stud 221 carried by each of the latches 214, while the forward end of each lever 220 is connected to the block of its associated unit by a link 223. It is, therefore, obvious that whenever any one of the push buttons 158 to 161 is operated and the block associated therewith is lowered, the lever 220, through the link 223, is rocked counter-clockwise. Such counter-clockwise movement of the lever 220, through the rear end of such lever coacting with the stud 221 carried by its associated latch 214, raises the latch 214, permitting the cash drawer to be moved to its open position by its associated expulsion spring 219. The drawers are manually returned to their normal closed position in the usual manner.

A brief description of the operation of this machine will now be given. As previously stated, this machine is capable of providing four different classifications of the severed portions 51 of the insertable price ticket. Such classification consists of segregating the severed portion of the ticket according to whichever one of the slots 146 to 149 inclusive the tickets are inserted into.

The insertion of a ticket into any one of the above mentioned slots positions the associated pawl 171 for that particular unit in the path of its corresponding plunger. Depression of the push button corresponding to the unit into which the ticket has been inserted moves its associated plunger downwardly to contact the pawl 171 and move said pawl and its associated block downwardly to advance the consecutive number printing wheels one step, to print the consecutive number in duplicate on the back of said insertable ticket, to emboss the word "Paid" on the main body of the ticket, to sever the stub portion from the main body of the ticket, and to deposit it in the receptacle associated therewith, which is provided for that purpose. At the same time, through the mechanism above described, the cash drawer associated with the particular unit operated is released.

Modified form

Figure 10:
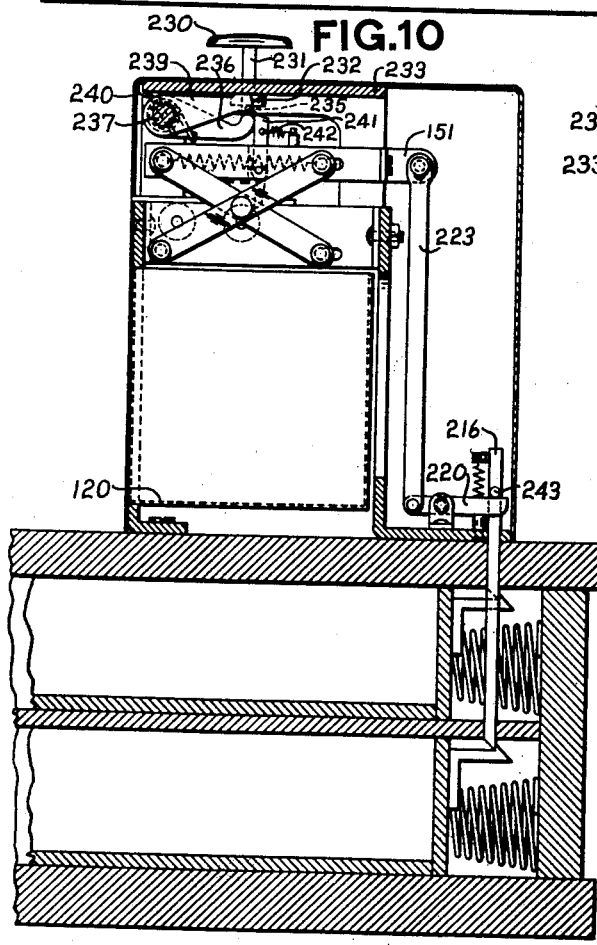
Fig. 10 is a vertical sectional view of the left side of the machine, shown in Fig. 9.
Figure 11:
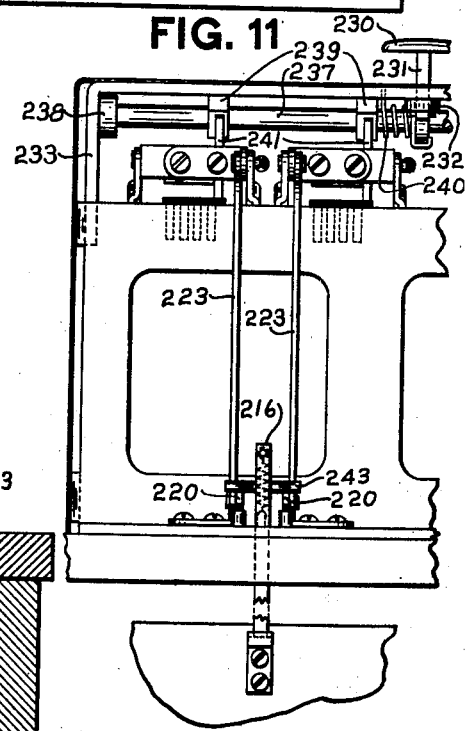
Fig. 11 is a detail rear view of two of the sets of printing and severing mechanisms together with the common operating means therefor, embodied in the machine disclosed in Fig. 9.

A modified form of the invention is disclosed in Figs. 9, 10, and 11. The machine thus illustrated is adapted not only to segregate the severed stub portions of the inserted price tickets according to the salesperson, but also to segregate such stubs of each salesperson according to "Cash" and "Charge" transactions. Therefore only two cash drawers are provided, one for each salesperson operating the machine. More cash drawers may be provided when necessary, two only being shown for the purpose of illustrating this particular modified form of the invention. Each time a price ticket is inserted in the machine and the machine operated, the cash drawer corresponding to the salesperson performing such operation is released regardless of whether the transaction is "Cash" or "Charge."

This machine is similar to the machine disclosed in Figs. 1 to 8 inclusive, heretofore described, in that the casing thereof is provided with four slots into which the price tickets may be inserted, the classification of the inserted ticket being determined by whichever one of the slots it is inserted into. Likewise a separate unit comprising a printing and severing mechanism like that illustrated and described above, in connection with the preferred form of the invention, is provided in connection with each one of said slots. Also there are provided four receptacles for retaining the severed portion of the inserted price ticket, one of said receptacles being associated with each unit. The receptacles are each provided with a locked door for gaining access thereto. It is therefore thought unnecessary to give a further description of such mechanism herein.

In this modified form of the invention, however, there is provided a common operating means for all four of said units. The machine is constructed, however, so that only the unit associated with the slot into which a ticket is inserted is operated. This operating mechanism will now be described in detail.

Referring now to Figs. 9, 10, and 11, a push button 230, fast on the upper end of a plunger 231 slidably mounted in a bearing 232 carried by a U-shaped frame 233, is provided for operating the machine. The U-shaped frame 233 is like the frame 166 heretofore described. A coil spring 234 (Fig. 9), wound around the plunger 231, normally maintains the plunger in its elevated position. A pin 235 (Fig. 10) carried by the lower end of the plunger 231 normally bears against the under side of the bearings 232 and thus limits the extent of upward movement given to the plunger by the spring 234.

Whenever the push button 230 and the plunger 231 are manually depressed during an operation of the machine, the lower end of the plunger 231 strikes the end of an arm 236 and rocks it clockwise. The arm 236 is secured to a shaft 237 journaled at each end in bearings 238 (only one of which is shown) carried by the frame 233. Also fast on the shaft 237 are four driving arms 239 (Figs. 9 and 10) only two of which are shown, one of said arms being provided for operating each ticket printing and severing unit. Thus, when the arm 236 is rocked clockwise in the manner above described, the shaft 237 and the arm 239 are rocked clockwise therewith against the action of a torsion spring 240 wound around the shaft 237, one end of which spring is fast to the frame 233 and the opposite end to the lower edge of the arm 236.

Each of the four ticket printing and severing units is provided with a driving pawl 241. The pawls 241 are like the pawls 171 heretofore described, both in construction and in operation. The pawls 241 are normally maintained in an ineffective position by spring 242 (only one of which is shown) holding the upper ends of such pawls out of the path of movement of the arms 239.

Whenever a ticket is inserted into any one of the slots associated with the various units, the innermost edge of the ticket strikes the lower end of the pawl 241 associated with said unit and rocks said pawl counter-clockwise against the action of the spring 242 to position the upper end thereof in the path of its corresponding arm 239. With the pawl 241 thus moved to its effective position, the arm 239 corresponding thereto, during its counter-clockwise movement, will strike the upper end of said pawl and move it downwardly to actuate said unit. The function of this type of unit has been previously described herein and therefore will not be further discussed here.

As previously stated, the present machine is provided with only two cash drawers, each drawer being associated with two of the ticket printing and severing units. Each cash drawer is operated when either of its associated units is operated. The means for releasing the cash drawers is of the same construction as that illustrated in Fig. 6 and heretofore described, except that each cash drawer latch carries a pin 243 which is adapted to be actuated by either one of the latch operating levers 220 associated with the two units corresponding to said drawer. It is therefore thought unnecessary to give a further detailed description of this mechanism. However, the differences in construction will now be described.

Referring to Figs. 10 and 11, each unit is provided with a train of mechanism identical with that shown in Fig. 6 and includes a block 151, link 223, and latch operating lever 220. By referring to Fig. 11 it will be seen that the links 223 are arranged side by side and the latch 216 for each cash drawer is located between the links 223. The latch 216 is provided with a long pin 243 which protrudes from each side of the latch 216 and into the path of the latch lever 220.

Thus, the insertion of a ticket into either one of the slots "A" or into either one of the slots "B" will condition the corresponding unit for operation by the push button 230. The operation of the push button 230, through the pawl 241, block 151, link 223, and lever 220, will raise the latch 216 to release the desired one of the cash drawers.

Since the operation of this machine is the same as that given in connection with the preferred form of this application except that a common operating means is here provided for all of the units, no detailed description thereof is thought necessary.

While the mechanisms herein shown and described are admirably adapted to fulfill the objects primarily stated, it is to be understood that it is not intended to confine the invention to the forms of embodiment herein disclosed, for it is susceptible of embodiment in various other forms, all coming within the scope of the claims which follow.

What is claimed is:

1. In a machine adapted to receive insertable tickets, having a plurality of units each of which includes mechanism for printing in duplicate on an insertable ticket and severing a stub portion from the main body of the ticket, and a receptacle associated with each unit into which are deposited the severed portions of the tickets, the combination of a plurality of cash drawers, each one of said drawers being associated with two of said units; a latch for each drawer keeping it normally in closed position; common operating means for said units; a member associated with each unit movable to render the common operating means effective to operate the unit associated therewith; means for unlatching one of said cash drawers when either one of its associated units is operated; and means for unlatching the other cash drawers when either one of the units associated with such drawer is operated.

2. In a machine of the class described, the combination of a plurality of paired registering units; a single operating means for the registering units normally ineffective; means to condition selected registering units so that operating of the operating means actuates them; a drawer associated with each pair of registering units; a latch for each drawer; and coexisting alternative means whereby operation of either one of a pair of registering units will unlatch the associated drawer.

3. In a machine adapted to receive insertable tickets, to print in duplicate on said tickets, and to sever stub portions therefrom, and having a receptacle into which said severed portions of the tickets are deposited, the combination of a cash drawer; a latch normally locking the drawer in closed position; a latch operating means; a ticket chute; a registering and ticket severing means the operation of which operates the latch operating means; a lever mounted on the registering and severing means, said lever being resiliently held so as to be moved by the insertion of a ticket into the ticket chute; and a manipulative means to actuate the registering and severing mechanism, said manipulative means being effectively operable only when the lever is moved by inserting a ticket in the chute.

ARTHUR C. KIRSHNER.